United States Patent
Fu et al.

(10) Patent No.: US 10,475,555 B2
(45) Date of Patent: Nov. 12, 2019

(54) METALLIZED OPTICAL FIBER

(71) Applicant: Dow Global Technologies LLC, Midland, MI (US)

(72) Inventors: Lin Fu, Naperville, IL (US); Anny Flory, Philadelphia, PA (US); Damien Polanksy, Katy, TX (US); Chester J. Kmiec, Phillipsburg, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/428,697

(22) PCT Filed: Sep. 5, 2013

(86) PCT No.: PCT/US2013/058182
§ 371 (c)(1),
(2) Date: Mar. 17, 2015

(87) PCT Pub. No.: WO2014/051953
PCT Pub. Date: Apr. 3, 2014

(65) Prior Publication Data
US 2015/0235742 A1    Aug. 20, 2015

Related U.S. Application Data

(60) Provisional application No. 61/706,381, filed on Sep. 27, 2012.

(51) Int. Cl.
*G02B 6/44* (2006.01)
*H01B 11/22* (2006.01)
*H01B 11/18* (2006.01)

(52) U.S. Cl.
CPC .......... *H01B 11/22* (2013.01); *G02B 6/44* (2013.01); *G02B 6/4402* (2013.01); *G02B 6/4416* (2013.01); *H01B 11/18* (2013.01)

(58) Field of Classification Search
CPC ...... H01B 11/22; H01B 11/18; G02B 6/4402; G02B 6/4416
(Continued)

(56) References Cited

U.S. PATENT DOCUMENTS

| | | | | |
|---|---|---|---|---|
| 4,239,336 A | * | 12/1980 | Parfree | G02B 6/4416 174/70 R |
| 4,579,420 A | * | 4/1986 | Winter | G02B 6/4416 174/105 R |

(Continued)

FOREIGN PATENT DOCUMENTS

| | | |
|---|---|---|
| EP | 0103411 A2 | 3/1984 |
| EP | 1930752 A1 | 6/2008 |

(Continued)

OTHER PUBLICATIONS

Eaton et al., Electrical Losses in Coaxial Cable, International Wire & Cable Symposium, Proceedings of the 57th IWCS, 515-520, Nov. 2008.

*Primary Examiner* — Kaveh C Kianni
*Assistant Examiner* — Hung Q Lam
(74) *Attorney, Agent, or Firm* — Husch Blackwell LLP

(57) ABSTRACT

A metallized optical fiber comprises: A) An optical fiber, and B) A conductive metal over and in contact with the optical fiber and having a thickness that is at least 0.15 times the thickness of the optical fiber. The metallized optical fiber can form a component of a hybrid optical fiber/coaxial cable, and it provides good protection against interference with the data signal traveling along the optical fiber from electrical current from an adjacent or near-by electrical conductor.

15 Claims, 3 Drawing Sheets

(58) Field of Classification Search
USPC .................. 385/100–104, 107–109, 111–113
See application file for complete search history.

(56) References Cited

U.S. PATENT DOCUMENTS

| | | | | |
|---|---|---|---|---|
| 4,695,127 | A * | 9/1987 | Ohlhaber | G02B 6/443 174/70 R |
| 4,896,939 | A * | 1/1990 | O'Brien | G02B 6/3816 174/110 R |
| 4,949,894 | A | 8/1990 | Winter et al. | |
| 4,952,012 | A * | 8/1990 | Stamnitz | G02B 6/4416 385/101 |
| 5,246,783 | A | 9/1993 | Spenadel et al. | |
| 5,574,815 | A * | 11/1996 | Kneeland | G02B 6/3817 174/70 R |
| 5,745,627 | A * | 4/1998 | Arroyo et al. | 385/101 |
| 5,944,865 | A | 8/1999 | Do et al. | |
| 6,343,172 | B1 * | 1/2002 | Schiestle et al. | 385/101 |
| 6,496,629 | B2 | 12/2002 | Ma et al. | |
| 6,714,707 | B2 | 3/2004 | Rossi et al. | |
| 2003/0113080 | A1 * | 6/2003 | Oxford | G02B 6/4427 385/113 |
| 2008/0192778 | A1 * | 8/2008 | Ohsono | B23K 26/0626 372/6 |
| 2008/0273852 | A1 * | 11/2008 | Parker | G01J 5/08 385/128 |
| 2009/0067776 | A1 * | 3/2009 | Ramos | G02B 6/4436 385/12 |
| 2009/0176093 | A1 * | 7/2009 | Appel et al. | 428/377 |
| 2010/0215327 | A1 * | 8/2010 | Braden | G02B 6/4403 385/101 |
| 2012/0008905 | A1 | 1/2012 | Han et al. | |
| 2012/0068086 | A1 * | 3/2012 | DeWitt | E21B 7/14 250/492.1 |
| 2012/0238867 | A1 * | 9/2012 | Hashimshony | 600/424 |
| 2014/0224787 | A1 * | 8/2014 | Harano | G02B 6/4202 219/616 |
| 2015/0030293 | A1 * | 1/2015 | Lv | G02B 6/4238 385/88 |

FOREIGN PATENT DOCUMENTS

| | | |
|---|---|---|
| GB | 2360854 A | 10/2001 |
| JP | S53-29742 A | 3/1978 |
| JP | S59-129803 A | 7/1984 |
| JP | 2001-358387 A | 12/2001 |
| WO | 2013/095908 A2 | 6/2013 |

* cited by examiner

METALLIZED OPTICAL FIBER

FIELD OF THE INVENTION

This invention relates to optical fibers. In one aspect, the invention relates to optical fibers comprising a metallized strip or coating while in another aspect, the invention relates to a metallized optical fiber as part of a hybrid optical fiber/coaxial cable.

BACKGROUND OF THE INVENTION

Hybrid optical fiber/coaxial cable which combines optical fiber and coaxial cable has been commonly employed globally by cable TV operators since the early 1990s. There are many applications where both power and data transmission is needed. For example, in a smart house, there are highly advanced automatic systems for lighting, temperature control, multi-media, security, window and door operations, and many other functions. This intelligent function is realized by sending coded signals through the home's wiring to switches and outlets that are programmed to operate appliances and electronic devices in every part of the house. The signals sent include both power and data signals.

Another example is a Tower Top Radio base station (TTR) cell tower. The TTR is connected to the common equipment via a small diameter cable that contains glass or plastic fibers for transporting digital signals and a pair of copper wires to supply power. In the applications where both power and data transmission is required, a hybrid cable is needed. However, many consumer applications demand wiring or cables of small dimension and lighter weight, and this brings the power and data carrying components of the hybrid cable ever closer together. This, in turn, can lead to problems with the power signal interfering with the data signal, or vice versa. As such, a need exists for a hybrid cable that can comprises power and data conductors in close approximation to one another yet without interfering with one another's functions.

SUMMARY OF THE INVENTION

In one embodiment, the invention is a metallized optical fiber comprising:
  A) An optical fiber, and
  B) A conductive metal over and in contact with the optical fiber and having a thickness that is at least 0.15 times the thickness of the optical fiber.

In one embodiment the invention is a hybrid fiber optic/coaxial cable comprising:
  A) A coaxial cable, and
  B) A metallized optical fiber comprising:
    1) An optical fiber; and
    2) A conductive metal over and in contact with the optical fiber and having a thickness that is at least 0.15 times the thickness of the optical fiber.

In one embodiment the invention is the metallized optical fiber or the hybrid fiber optic/coaxial cable, both as described above, connected to a power source.

In one embodiment the invention is a method of transmitting a data signal through a metallized optical fiber, the method comprising the step of transmitting the data signal through a metallized optical fiber comprising an optical fiber and a metal coating over and in contact with the optical fiber and the metal coating having a thickness that is greater than the wavelength of the data signal.

DETAILED DESCRIPTION OF THE PREFERRED EMBODIMENT

Definitions

Figure 1:
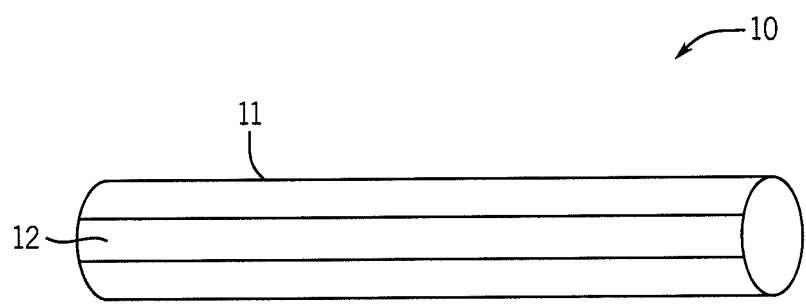
FIG. 1 is a schematic of a metalized optical fiber.

Unless stated to the contrary, implicit from the context, or customary in the art, all parts and percentages are by weight. For purposes of United States patent practice, the contents of any referenced patent, patent application or publication are incorporated by reference in their entirety (or its equivalent U.S. version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the thickness of the metal coating over the fiber optic cable.

"Comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Cable," "power cable," and like terms means at least one wire or optical fiber within a protective jacket or sheath. Typically, a cable is two or more wires or optical fibers bound together, typically in a common protective jacket or sheath. The individual wires or fibers inside the jacket may be bare, covered or insulated. Hybrid or combination cables may contain both electrical wires and optical fibers. The cable, etc., can be designed for low, medium and high voltage applications. Typical cable designs are illustrated in U.S. Pat. Nos. 5,246,783, 6,496,629 and 6,714,707.

"Optical fiber" and like terms mean a fiber that consists of a core and a cladding layer that is selected for total internal reflection due to the difference in the refractive index between the two. The cladding is usually coated with a layer of acrylate polymer or polyimide. This coating protects the fiber from damage but does not contribute to its optical wavelength properties.

"Coaxial cable", "coax" and like terms mean a cable comprising an inner conductor surrounded by a flexible, tubular insulating layer, surrounded by a tubular conducting shield. The term coaxial comes from the inner conductor and the outer shield sharing a geometric axis.

Metallized Optical Fiber

In one embodiment, the invention is a metallized optical fiber. One design is shown in FIG. 1. Metallized optical fiber 10 comprises optical fiber 11 and metal strip 12. Optical fiber 11 has a generally cylindrical configuration although its configuration can vary to convenience. The composition of the core (e.g., glass or plastic; not shown) and the number, thicknesses and compositions of the cladding(s) (e.g., acrylate, imide, etc.; and not shown) can also vary to convenience. These and other considerations regarding the composition and structure of optical fibers, as well as the methods of their construction, are well known in the art.

Metal strip 11 is in contact with optical fiber 10. Metal strip 11 can comprise any conductive metal, e.g., copper, aluminum, a metal of the platinum group (platinum, palladium, etc.), a precious metal (e.g., gold, silver), etc., and it can vary in size, configuration and thickness. Copper is a preferred metal for use in this invention. In one embodiment, the metal strip completely, or nearly completely (e.g., less than 100 percent but more than 90, or more than 95, or more than 99, percent), covers the entire surface of the optical fiber. In one embodiment the metal strip covers less than the entire surface of the optical fiber and in such embodiments, the metal strip covers at least 89 percent, preferably at least 50%, more preferably at least 20% and even more preferably at least 10%, of the surface of the optical fiber. The configuration of the metal strip, if it covers less than the entire surface area of the optical fiber, can vary to convenience, e.g., straight, zigzag, serpentine, spiral, etc., and it runs along the longitudinal axis of the optical fiber.

The thickness of the metal strip is greater than the transmitted signal frequency. For an optical fiber designed to carry a signal at a frequency of 60 hertz (Hz), the metal (e.g., copper) thickness is typically about 8.5 millimeters (mm). As long as the thickness of metal strip is greater than the frequency of the signal carried by the optical fiber, then the transmitted signal is the same as a signal transmitted through a metal rod with the same surface area Due to the thickness of the metal, power signals will travel on the skin of the metal strip, not through the optical fiber itself, and thus power signals will not interfere, or interfere only at a nominal level, with the data signals carried by the optical fiber. The calculation of metal thickness for any given signal frequency is known in the art as exemplified in Electrical Losses in Coaxial Cable by Eaton and Kmiec, International Wire & Cable Symposium, Proceedings of the 57$^{th}$ IWCS, pp. 515-520 (November 2008).

The skin effect of a conductor is the tendency of the electric current to distribute itself within the conductor such that the densit near the surface is greater than at the core of the conductor. The skin depth δ reduces inversely with the square of the frequency:

$$\delta(m) = \sqrt{(2*\rho)/(*\omega*\mu)}$$

where ρ is the resistivity of the conductor, ω is the angular frequency of the current=2π, and μ is the absolute magnetic permeability of the conductor. For a copper conductor this equation reduces to:

$$\delta(m) = 0.06/\sqrt{\text{Frequency (Hz)}}.$$

At 60 Hz, the skin depth is 8.5 mm; at 1 MHz, the skin depth is 66 μm; and at 1 GHz, the skin depth is 2.08 μm.

Figure 4A:
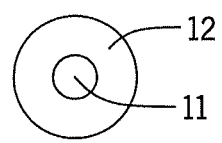
FIG. 4A is an end-on view schematic of one embodiment of this invention in which metal layer 12 has a thickness equal to the thickness (i.e., diameter) of the optical fiber 11 with which it is in contact.
Figure 4B:
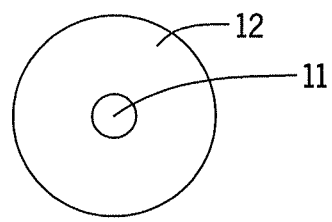
FIG. 4B is the same as FIG. 4A except that metal layer 12 has a thickness of twice the diameter or thickness of optical fiber 11.

In one embodiment of the invention, the thickness of the metal on the optical fiber is a function of the size, e.g., thickness or diameter, of the optical fiber. Typically the thickness of the metal is at least 0.15, more typically at least 1 (FIG. 4A) and even more typically at least 2 (FIG. 4B), times the thickness or diameter of the optical fiber. Thus, if the optical fiber has a thickness or diameter of 1 mm, then the thickness of the metal in contact with the optical fiber is at least 0.15 mm, preferably at least 1 mm and even more preferably at least 2 mm.

The metal can be applied to the optical fiber in any convenient manner, e.g., electroplating, electrolysis plating, through the use of an adhesive (see, for example, U.S. Ser. No. 61/577,918 filed on Dec. 20, 2011), etc. These methods are known in the art, and can be used in combination with one another, e.g., applying a thin, e.g., 1-100 microns, initial layer to the surface of the optical fiber followed by electroplating one or more layers atop of the initial layer to build to a total thickness of 1,000, 1,500 or more microns. While electroplating and electrolysis plating are well suited for coating the entire surface of the optical fiber, these techniques also work for coating less than the entire surface of the optical fiber by employing various known masking and rinsing techniques. If an adhesive is employed, typically it possesses good dielectric properties and exhibits good bonding strength to metal and the composition of the outermost cladding layer of optical fiber, e.g., an acrylic.

Hybrid Optical Fiber/Coaxial Cable

The hybrid cable is composed of, but not limited to, fiber optic cable, coaxial cable and an electrical conductor, e.g., copper. These hybrid cables carry data and power. In the hybrid cable of this invention, the electrical conductor, e.g., copper, can be replaced with fiber optic that is coated with a metal strip to carry the current. Compared to coaxial cable, the fiber optic cable can carry more data (higher bandwidth) with low noise and less susceptibility to interference.

Figure 2:
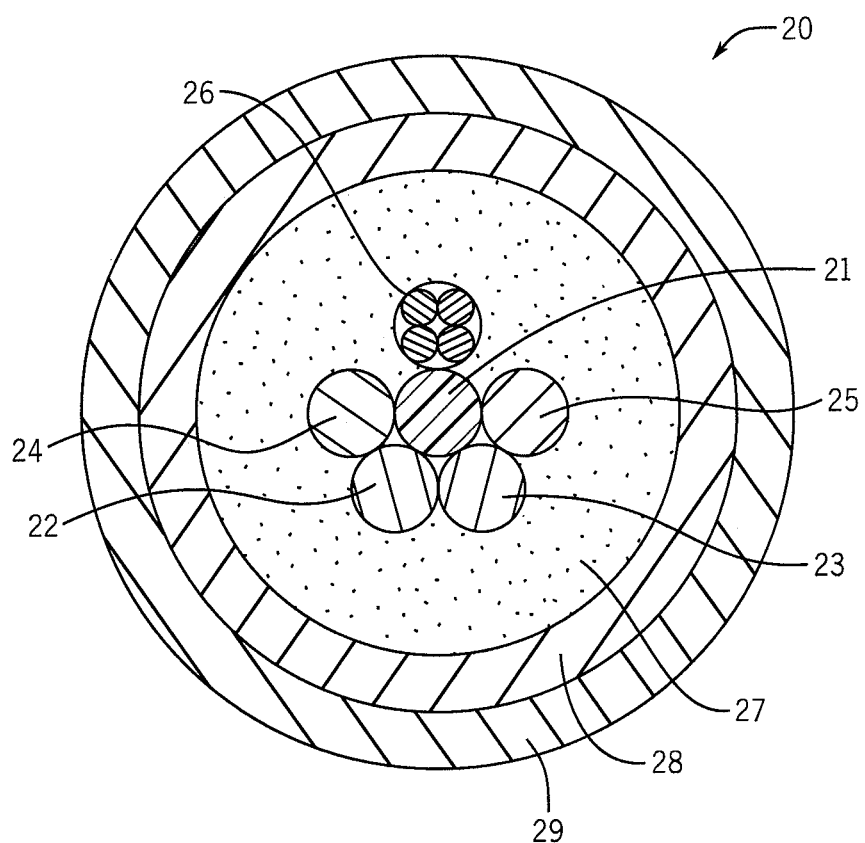
FIG. 2 is a schematic of a prior art hybrid fiber optic/coaxial cable.

In one embodiment the invention is a hybrid optical fiber/coaxial cable. FIG. 2 illustrates one embodiment of a prior art design of a hybrid optical fiber coaxial cable. Hybrid optical fiber/coaxial cable 20 comprises a central core strength member 21 designed to impart carrying strength to the hybrid cable. This element of the hybrid cable is typically is made from metal or a high strength plastic, and it does not carry power or information. Electrical conductors 22, 23 and 25 are typically made of copper or aluminum, and carry power, i.e., electrical current. These conductors are typically encased in one or more semiconductor and/or insulation sheaths (not shown). Cable 24 is a coaxial cable.

Fiber optic cable 26 comprises four optical fibers encased in a protective jacket. Each optical fiber can itself be encased in one or more protective sheaths and the space between the four optical fibers can be filled with a matrix filler that provides both protection and dielectric insulation.

The strength member and the various conductors of the hybrid cable are encased in filler matrix 27 which provides both protection against physical injury and dielectric insulation. This matrix is then encased within semiconductive insulation sheath 28 which in turn is encased within outer protective jacket 29. The various compositions and methods of manufacture for the matrix filler, semiconductive sheath and protective jacket are all well known in the art.

Figure 3:
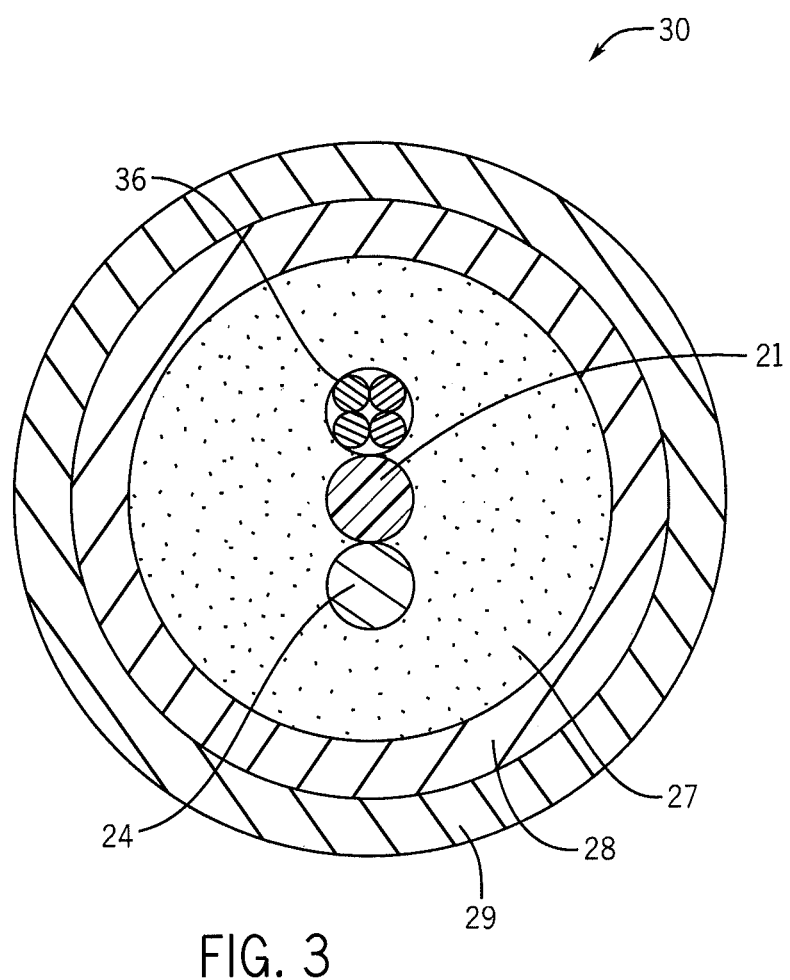
FIG. 3 is a schematic of one embodiment of a hybrid fiber optic coaxial cable of this invention.

One embodiment of the hybrid cable of this invention is illustrated in FIG. 3. Hybrid cable 30 is similar in design to hybrid cable 20 except that hybrid cable 30 does not comprise stand-alone electrical conductors 22, 23 and 25. Rather, fiber optic cable 26 is replaced with fiber optic cable 36 in which the four optical fibers are metallized, i.e., they comprise a metal coating one embodiment of which is illustrated in FIG. 1. This metal strip or coating performs the function of the one or more of the electrical conductors of the prior art hybrid cable as illustrated in FIG. 2.

The hybrid cable of this invention is used in the same manner as known hybrid cables. The cable is connected to a power source, one or more sources for data transmission, e.g., computer, sensor, e.g., and ultimately to end-use devices, e.g., computer, household appliance, industrial or recreational equipment and the like. The metal of appropriate thickness attached to the optical fiber allows for the transmission of any electrical current received from adjacent or near-by electrical conductors (or from any other source) to be transferred down the fiber to the end-use device without interfering with the fiber's data transmission.

It is specifically intended that the present invention not be limited to the embodiments and illustrations contained herein, but include modified forms of those embodiments including portions of the embodiments and combinations of elements of different embodiments as come within the scope of the following claims.

We claim:

1. A metallized optical fiber comprising:
   A) An optical fiber for data transmission, the optical fiber consisting of an optical fiber and a cladding coating the optical fiber; and
   B) A metal layer over, in contact with, and adhered to, the cladding of the optical fiber,
   the metallized optical fiber characterized by the metal layer having a thickness that is at least 1 times the thickness of the optical fiber,
   wherein the metal layer comprises at least one of copper, aluminum, a metal of the platinum group or metal of the precious metal group, and the metal layer is in the form of a strip that (i) runs along a longitudinal axis of the fiber and (ii) covers less than the entire surface of the optical fiber.

2. The fiber of claim 1 in which the metal strip covers at least 10 percent but less than 90 percent of the surface of the optical fiber.

3. A hybrid fiber optic/coaxial cable comprising:
   A) A coaxial cable,
   B) A metallized optical fiber for data transmission comprising:
      1) An optical fiber consisting of an optical fiber and a cladding coating the optical fiber; and
      2) A metal layer over, in contact with, and adhered to, the cladding of the optical fiber,
   C) An electrical conductor, and
   D) A strength member made from metal and centrally-located within the hybrid optical fiber/coaxial cable, the strength member in contact with both the optical fiber and the coaxial cable,
   the metallized hybrid fiber optic/coaxial cable characterized by the metal coating having a thickness that is at least 1 times the thickness of the optical fiber.

4. The hybrid fiber optic/coaxial cable of claim 3 connected to a power source.

5. The hybrid optical fiber/coaxial cable of claim 3 in which the metal coating is copper and it covers the entire, or near entire, surface of the optical fiber.

6. A method of transmitting a data signal through a cable, the method comprising connecting the cable to a power source and a data signal source, the cable comprising the hybrid optical fiber/coaxial cable of claim 3.

7. The fiber of claim 1, wherein the thickness of the metal layer is at least two times the diameter of the optical fiber.

8. The fiber of claim 1 wherein the metal layer is electroplated onto the cladding and the cladding is a material selected from the group consisting of an imide and an acrylate.

9. The fiber of claim 8 wherein the cladding material is an acrylate.

10. The fiber of claim 9, wherein the thickness of the metal layer is at least two times the diameter of the optical fiber.

11. The hybrid optical fiber/coaxial cable of claim 3, wherein the thickness of the metal layer is at least two times the diameter of the optical fiber.

12. The hybrid optical fiber/coaxial cable of claim 3, wherein the metal layer is electroplated onto the cladding and the cladding is a material selected from the group consisting of an imide and an acrylate.

13. The hybrid optical fiber/coaxial cable of claim 12, wherein the cladding material is an acrylate.

14. The hybrid optical fiber/coaxial cable of claim 13, wherein the thickness of the metal layer is at least two times the diameter of the optical fiber.

15. The hybrid optical fiber/coaxial cable of claim 3, wherein the strength member does not carry power or information.

* * * * *